US006764061B2

(12) United States Patent
Haeberer et al.

(10) Patent No.: US 6,764,061 B2
(45) Date of Patent: Jul. 20, 2004

(54) SOLENOID VALVE FOR CONTROLLING AN INJECTION VALVE OF AN INTERNAL COMBUSTION ENGINE

(75) Inventors: Rainer Haeberer, Bretten (DE); Andreas Wengert, Oppenweiler-Reichenberg (DE); Ralf Maier, Schwaebisch-Gmuend (DE); Stefan Haug, Waldenbuch (DE)

(73) Assignee: Robert Bosch GmbH, Stuttgart (DE)

( * ) Notice: Subject to any disclaimer, the term of this patent is extended or adjusted under 35 U.S.C. 154(b) by 83 days.

(21) Appl. No.: 10/184,848

(22) Filed: Jun. 28, 2002

(65) Prior Publication Data

US 2003/0020039 A1 Jan. 30, 2003

(30) Foreign Application Priority Data

Jun. 28, 2001 (DE) ........................................ 101 31 201

(51) Int. Cl.[7] ................................................ F16K 31/02
(52) U.S. Cl. .............................. 251/129.16; 251/129.19
(58) Field of Search ....................... 251/129.14, 129.16, 251/129.19, 129.21

(56) References Cited

U.S. PATENT DOCUMENTS 2,548,239 A * 4/1951 Ray ...................... 251/129.16
3,861,643 A * 1/1975 Moffatt .................. 251/129.14
4,390,130 A * 6/1983 Linssen et al. ........ 251/129.16
4,660,770 A * 4/1987 Gieseking .............. 251/129.16
4,763,635 A * 8/1988 Ballhause et al. ..... 251/129.16
4,848,727 A * 7/1989 Nanbu et al. .......... 251/129.19
5,110,087 A * 5/1992 Studtmann et al. .... 251/129.16
5,161,779 A * 11/1992 Graner et al. .......... 251/129.16
5,901,941 A * 5/1999 Ricco .................... 251/129.16
6,092,737 A 7/2000 Bosch et al.
6,131,880 A * 10/2000 Hahn et al. ............ 251/129.16

FOREIGN PATENT DOCUMENTS

| | | |
|---|---|---|
| DE | 196 50 865 | 6/1998 |
| EP | 0 976 923 | 2/2000 |
| WO | WO 98/25025 | 6/1998 |

* cited by examiner

*Primary Examiner*—John Bastianelli
(74) *Attorney, Agent, or Firm*—Kenyon & Kenyon

(57) ABSTRACT

A solenoid valve is for controlling an injection valve of an internal combustion engine, including a housing part, an electromagnet having a magnetic coil and a magnetic core, an armature acted upon by a valve spring and axially movable between the electromagnet and a valve seat, and a control valve member moved by the armature and cooperating with the valve seat for opening and closing a fuel passage, in which the armature is situated in the housing part movable in the radial direction free from mechanical guiding means. A further development provides that, when a current is applied to the electromagnet,the armature may be aligned in the radial direction, by magnetic reluctance forces then acting upon the armature, into a centrical position with reference to the centerline of the electromagnet.

10 Claims, 3 Drawing Sheets

SOLENOID VALVE FOR CONTROLLING AN INJECTION VALVE OF AN INTERNAL COMBUSTION ENGINE

FIELD OF THE INVENTION

The present invention relates to a solenoid valve for controlling an injection valve of an internal combustion engine.

BACKGROUND INFORMATION

German Published Patent No. 196 50 865 discusses a solenoid valve used for controlling the fuel pressure in the control pressure chamber of an injection valve, such as an injector of a common rail injection system. In such injection valves, the fuel pressure in the control pressure chamber controls the movement of a valve plunger with which the injection opening of the injection valve is opened or closed. The known solenoid valve has an electromagnet situated in a housing part, an axially movable armature guided in a sliding piece and acted upon by a closing spring, and a control valve member moved by the armature which cooperates with the valve seat of the solenoid valve and thereby controls the fuel discharge from the control pressure chamber. The armature has an armature plate, and an armature bolt which is supported in a slidingly movable manner in the mechanical guideway formed as a bore in the sliding piece.

In the known solenoid valves the sliding piece has to be manufactured with great precision in order to guarantee optimal functionality of the solenoid valve. The mechanical armature guideway through the sliding piece gives rise to frictional losses, which have to be considered when designing the overall system. In addition to that, fitting the sliding piece into the housing part of the solenoid valve requires a mechanically costly overall construction.

SUMMARY OF THE INVENTION

The advantages of the present invention arise by saving the sliding piece which has been used up to the present time, and discontinuing of the production and work steps connected with the sliding piece. Because of the discontinuation of the sliding piece guiding the armature, frictional losses caused by the mechanical armature guideway during opening and closing the solenoid valve are avoided. Because of the discontinuation of the sliding piece, the construction of the armature can advantageously be greatly simplified and optimized from a functional point of view. On account of the simplified construction, the deviation of the dynamic behavior of the solenoid valve is further advantageously reduced, so that the reliability of the overall system is increased. Beyond that, a substantial advantage comes about from the considerable cost reduction during production of the solenoid valve. Thus, not only is the sliding piece omitted, but the armature can also be designed to be less costly, and can be made, for example, as a simple stamped part.

A particularly flat construction method of the armature is achieved by designing the armature as a disk-shaped armature plate, which acts directly upon the control valve member with its side facing away from the electromagnet. Advantageously, in the closed position of the solenoid valve, tilting moments transmitted by the closing spring to the armature are greatly reduced.

Advantageously, armature plate and control valve member are produced as separate components, so that the radially movable armature plate can shift relatively to the control valve member, without the control valve member necessarily being shifted from its centrical position relative to the valve seat. A lateral impact of the control valve member next to the valve seat and a sliding into the valve seat connected with frictional losses are hereby largely avoided.

Especially advantageous is an exemplary embodiment in which, when a current is applied to the electromagnet, the armature may be aligned in the radial direction, by magnetic reluctance forces acting upon the armature, into a centrical position with reference to the centerline of the electromagnet. This can advantageously be achieved if the armature and the magnetic core have geometrical structures situated concentrically about their respective centerline at their mutually facing pole faces, which structures cooperate, when current is applied to the electromagnet, in such a way that the armature is aligned in the centrical position.

Because in the centrical position of the armature its center axis is situated concentrically with the fuel passage, tilting moments acting upon the armature may be further reduced. During the closing of the solenoid valve, the armature meets the control valve member centrically from its centrical position, so that in the closed state of the solenoid valve the control valve member lies centrically on the valve seat for fuel passage, and tilting moments are reduced.

DETAILED DESCRIPTION

Figure 1:
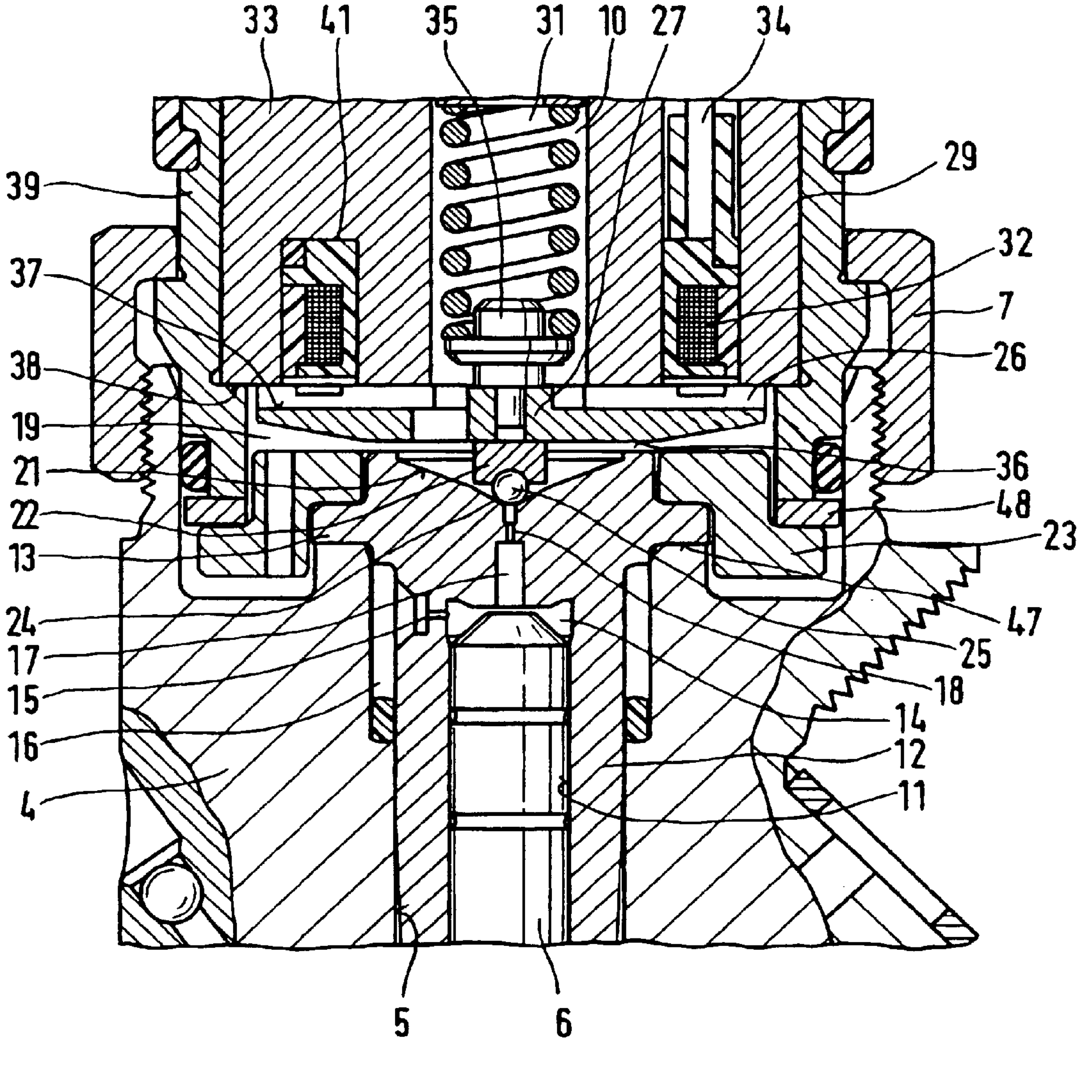
FIG. 1 shows a section of the upper part of a fuel injector in an exemplary embodiment of the solenoid valve according to the present invention.

FIG. 1 shows the upper part of a fuel injector which is intended for use in a fuel injection system, particularly a common rail system for diesel fuel, which is equipped with a fuel high-pressure reservoir that is continually supplied with high-pressure fuel by a high-pressure fuel booster pump. The fuel injector has a valve housing 4 having a longitudinal bore 5, in which a valve plunger 6 is positioned, which acts with its one end upon a valve needle positioned in a nozzle body. The valve needle is situated in a pressure chamber which is supplied with fuel under high pressure via a pressure bore. When there is an opening lift movement of valve plunger 6, the valve needle is lifted by the high fuel pressure, applied steadily to a pressure shoulder of the valve needle, in the pressure chamber counter to the closing force of a spring. The injection of the fuel into the combustion chamber of the internal combustion engine takes place through an injection orifice then connected to the pressure chamber. By lowering of valve plunger 6, the valve needle is pressed in the closing direction into the valve seat of the injection valve, and the injection process is ended. Valve plunger 6 is guided in a cylindrical bore 11, at its end facing away from the valve needle, which has been inserted into valve piece 12 which is set into valve housing 4. In cylindrical bore 11, the end face of valve plunger 6 closes in a control-pressure chamber 14, which is connected to a fuel high-pressure connection via a supply channel. The supply channel is essentially designed in three parts. A bore going radially through the wall of valve piece 12, whose inner walls form a supply throttle 15 along part of their length, is constantly connected to an annular space 16 surrounding valve piece 12 on its outer circumference, which annular space, in turn, is in constant connection to the fuel high-pressure connection. Control pressure chamber 14 is subjected via supply throttle 15 to the high fuel pressure prevailing in the high-pressure reservoir. A bore running through valve piece 12 branches out from control pressure chamber 14 coaxially with valve plunger 6, and it forms a fuel discharge channel 17, furnished with a discharge throttle 18, which opens out into a discharge chamber 19, which is connected to a fuel low-pressure connection. The outlet of fuel discharge channel 17 from valve piece 12 lies in the region of a cone-shaped, countersunk part 21 of the end face of valve piece 12. In the exemplary embodiment shown here, valve piece 12 is held in valve housing 4, with the aid of a clamping element 23 having two alternate clamping shoulders, together with housing part 39 of the solenoid valve via a screw member 7. For this purpose, valve piece 12 has a circumferential flange 13 which lies on an annular shoulder 47 of valve housing 4. Flange 13 is clamped between clamping element 23 and valve housing 4. An adjustment disk 48 lies against the other shoulder of clamping element 23, facing away from valve housing 4. The circumferential edge section of housing part 39 of the solenoid valve lies up against adjustment disk 48. The clamping shoulder of screw member 7 lies against solenoid valve housing 39, and is screwed to valve housing 4. In this exemplary embodiment, using only one screw member 7, solenoid valve housing 39 is fixed to valve housing 4 and valve piece 12 is clamped at the same time.

In conical part 21 a valve seat 24 is formed, with which a control valve member 22, 25 of a solenoid valve controlling the injection valve cooperates. Control valve member 22, 25 is formed in two parts, having one valve ball 25 and a socket part 22 accommodating valve ball 25 and coupled to an armature 27 which acts together with an electromagnet 29 of the solenoid valve. Although it is conceivable to form the armature and control valve member 22, 25 in one piece, it is provided in the exemplary embodiment shown here that armature 27 and control valve member 22, 25 shall be formed as separate parts. The side of socket part 22 facing away from valve ball 25 is formed as a flat contact surface for armature 27. Armature 27 is made in one piece, and is formed essentially as a circular disk-shaped armature plate. The armature plate has a pole face 37 facing electromagnet 29 and a flat surface 36 facing away from it which acts directly upon socket 22 of the control valve member. A peg 35 projects perpendicularly from pole face 37 of armature 27, which penetrates a recess 10 of electromagnet 29, in which a closing spring 31 is also situated which is supported on peg 35. Armature 27 and control valve member 22, 25 coupled to the armature are constantly acted upon by a housing-mounted supported closing spring 31 in the closing direction, so that control valve member 22, 25 normally lies adjacent to valve seat 24 in the closing position. When the electromagnet is activated, armature 27 is drawn away from valve seat 24 in the axial direction, and discharge channel 17 is opened towards discharge chamber 19.

Figure 3:
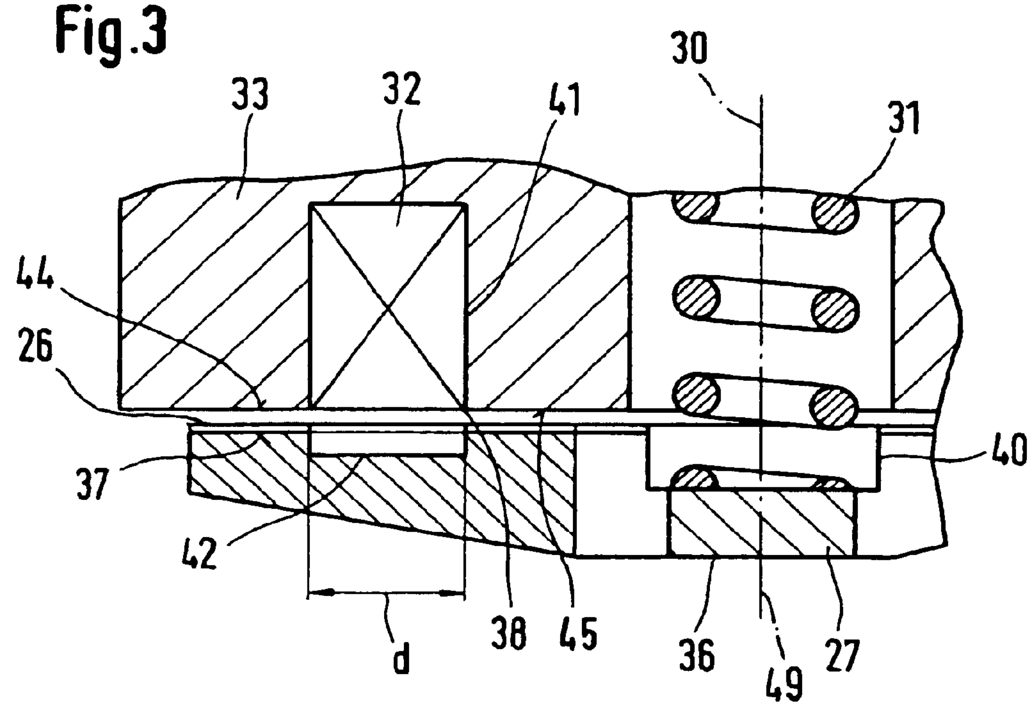
FIG. 3 shows an enlarged detailed view as in another exemplary embodiment having the geometrical structures centering the armature.

As can also be seen in FIG. 1, electromagnet 20 includes a solenoid coil 32 and a magnetic core 33. Magnetic core 33 at its pole face 38 has an annular recess 41, in which solenoid coil 32 is situated. Connections 34 of the solenoid coil run to the outside through magnetic core 33. Recess 41 subdivides pole face 38 of the magnetic core into an inner annular pole face section 45 and an outer annular pole face section 44, which both face pole face 37 of the armature plate, as can be seen best in FIG. 3. When a current acts upon the electromagnet, a closed magnetic circuit forms over the gap between pole face section 44 and pole face 37 of the armature and the gap between pole face 37 of the armature and pole face section 45 of the magnetic core. Between the pole face of magnetic core 33 and pole face 38 of the armature plate a minimum distance may be allowed, in order to prevent a so-called magnetic adhesion of the armature to magnetic core 33. As shown in FIG. 3, this can be achieved, for example, by a layer 26 made of a magnetic, non-conductive material on pole face 37 of the armature plate. Layer 26 can be made, for instance, of chromium or teflon. The layer may be connected to the armature by soldering, welding, adhesion, or in another suitable way. It is also possible to insert one or more distance washers between pole face 38 of armature 27 and magnetic core 33. A further possibility for seeing that the minimum distance between the armature plate and the magnetic core is kept, is to provide the armature with structures proceeding from pole face 37 (such as studs), which are supported on the electromagnet or on a sleeve mounted in the electromagnet. Furthermore, for example, the armature plate may be made to lie against a sleeve mounted in the electromagnet and proceeding from pole face 38 of magnetic core 33.

The opening and closing of the injection valve is controlled by solenoid valve 30, as described below. As described before, armature bolt 27 is constantly acted upon by closing spring 31 in the closing direction, so that control valve member 25 lies against valve seat 24 in the closing position when the electromagnet is not activated, and control pressure chamber 14 is closed towards discharge side 19, so that high pressure very rapidly builds up there, via the supply channel, which is also present in the fuel high-pressure reservoir. The pressure in control pressure chamber 14 generates a closing force on valve plunger 6, and thus on the valve needle connected with it, which is greater than the forces acting, on the other hand, in the opening direction as a result of the high pressure present. If control pressure chamber 14 is opened toward discharge side 19 by opening the solenoid valve, the pressure in the low volume of control pressure chamber 14 goes down very fast, since it is decoupled from the high-pressure side via supply throttle 15. As a result, the force acting on the valve needle in the opening direction outbalances the high fuel pressure present at the valve needle, so that the latter moves upwards, and with that the at least one injection orifice is opened for injection. However, if solenoid valve 30 closes fuel discharge channel 17, the pressure in control pressure chamber 14 may be built up again by fuel that continues to flow via supply channel 15, so that the original closing force is present, and the valve needle of the fuel injector closes.

As shown in FIG. 1, armature 27 of the solenoid valve according to an exemplary embodiment of the present invention may be moved in housing part 39 of the solenoid valve in the radial direction without interference by a mechanical guideway. During a radial movement of armature 27, surface 36 of the armature plate may glide along on socket part 22. During closing of the solenoid valve, closing spring 31 presses armature 27 and control valve member 22, 25 against valve seat 24, it being possible that the mechanically unguided armature plate may tilt a little if it hits socket part 22 in an off-center fashion. However, even in the case of a slight deflection of the armature plate in the radial direction, control valve member 25 is always reliably pressed into valve seat 24. Because of the flat design of armature 27 as a disk-shaped armature plate, the tilting moments are greatly reduced in comparison with the case of a T-shaped armature having armature bolts proceeding from the armature plate.

Figure 2:
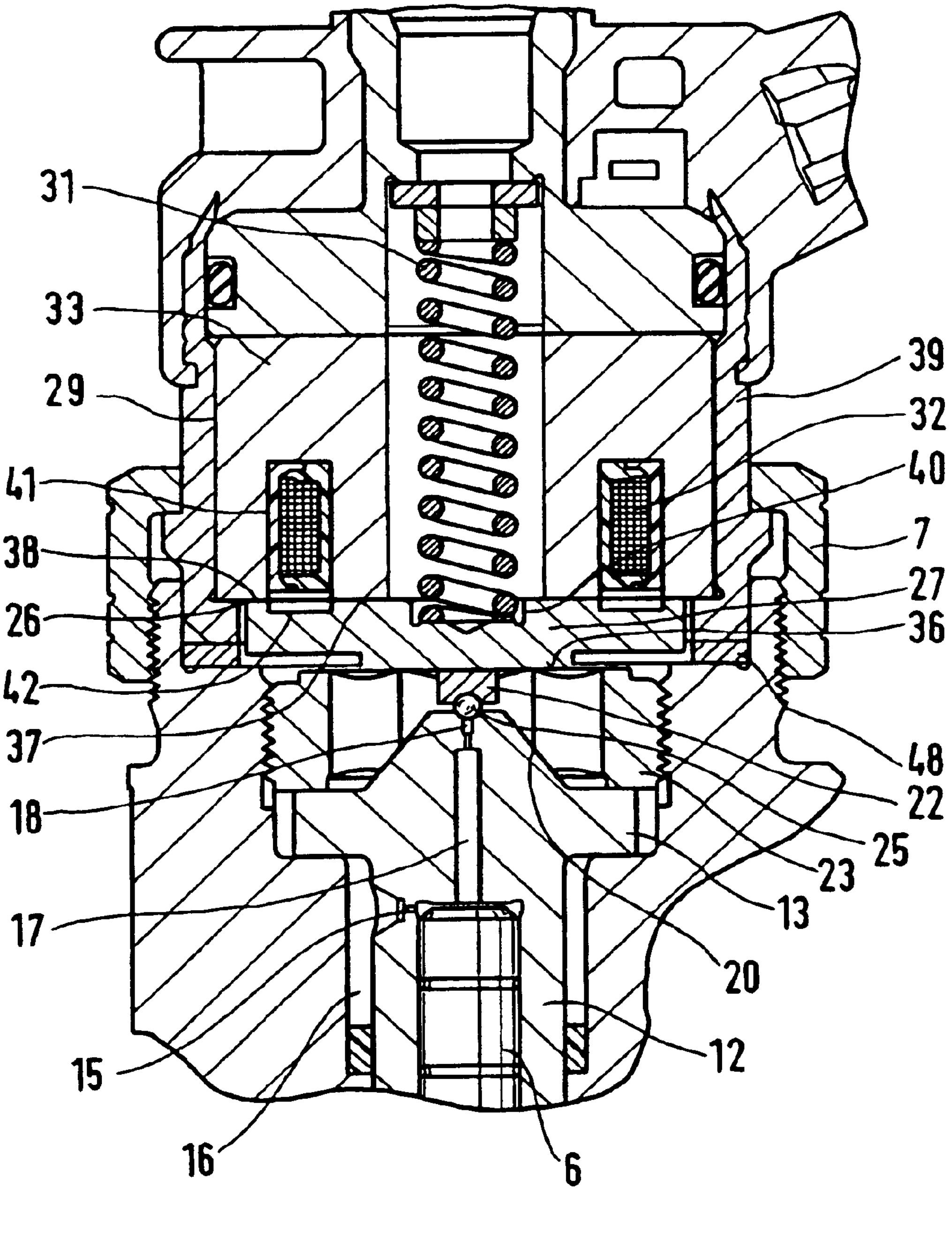
FIG. 2 shows a section from the upper part of a fuel injector in another exemplary embodiment of the solenoid valve according to the present invention.

FIG. 2 shows a further exemplary embodiment of the present invention. The basic design of the solenoid valve shown in FIG. 2 is similar to that in FIG. 1. The same parts have the same reference numerals. As may be seen, in contrast to FIG. 1, plate-shaped armature 27 here has a centrical recess 40 on its side facing the electromagnet, into which closing spring 31 penetrates. Here the point of contact of closing spring 31 lies particularly close to ball 25 of the control valve member, so that tilting moments acting upon the armature when the solenoid valve is closed are even further reduced. Furthermore, valve piece 12 is clamped into valve housing 4 using a separate, screwable clamping member 23. Solenoid valve housing 39 is fastened by screw member 7 directly to valve housing 4 via adjustment disk 48. In order to have sufficient room for clamping member 23, in spite of the flat armature, end face 12 of the valve piece which faces the electromagnet is provided with a truncated-cone-shaped section 20, which is surrounded by a flange 13. Valve seat 24 is mounted centrically into truncated-cone-shaped section 20. As may be seen, the space surrounding truncated-cone-shaped section 20 forms an accommodation for adjusting nut 23, which lies adjacent to flange 13 of valve piece 12. The minimum distance between armature 27 and electromagnet 29 is attained by putting a coating of non-magnetic material on the armature.

A further exemplary embodiment of the present invention is especially advantageous, in which the armature plate is centered using magnetic reluctance forces, in order to avoid off-centering of the armature plate and the resulting tilting of the armature plate when it hits the control valve member. This may be attained by providing armature 27 and magnetic core 33 of electromagnet 29 with geometrical structures which cooperate, when a current is applied to electromagnet 29, in such a way that armature 27 is aligned to a centrical position, in which its centerline 45 runs coaxially with centerline 30 of the electromagnet (centerline 45 and centerline 30 lie on a straight line). This has the advantage that the armature plate is constantly centered when the solenoid valve is opened, and, at switching off of the electromagnet when the solenoid valve is closed, it hits the control valve member from this centrical position. The geometrical structures may be provided both for the solenoid valve shown in FIG. 1 and the one shown in FIG. 2. In FIG. 2 the geometrical structures are indicated by reference numerals 41 and 42. An enlarged detailed view is found in FIG. 3.

As may be seen in FIG. 3, electromagnet 29 has a magnetic core 33 and a coil 32. Magnetic core 33 is furnished with groove-shaped recess 41 running concentrically with its centerline 30, in which coil 32 is mounted. Pole face 38 of magnetic core 33 is subdivided into an outer annular pole face section 44 and an inner pole face section 45 by recess 41. The special feature of this exemplary embodiment is the recess 42, which is inserted in pole face 37 of armature 27 concentrically with centerline 45 of the armature, and facing magnetic core 33. This likewise annular recess 42 in the form of a circumferential groove has approximately the same outer diameter and inner diameter, and thus it has the same width d as recess 41 of magnetic core 33. Recesses 41 and 42, allocated to each other, cooperate magnetically in such a way that, when a current is applied to the electromagnet, centerline 45 of armature 27 runs coaxially with centerline 30 of the electromagnet. The magnetically centering effect is explained by magnetic reluctance forces which appear when there is a radial deflection of the armature plate. If recesses 41 and 42 are not situated over one another in a covering manner, the magnetic field lines at the edges of the two recesses 41, 42 are distorted. The reluctance forces resulting from this pull the armature plate back again until recesses 41, 42 lie above one another in a covering manner, and centerline 45 of the armature runs coaxially with centerline 30 of electromagnet 29. For this, recess 42 does not necessarily have to be mounted circumferentially in armature 27. It is also possible to use segments situated concentrically with centerline 45 or other suitable designs.

Figure 4:
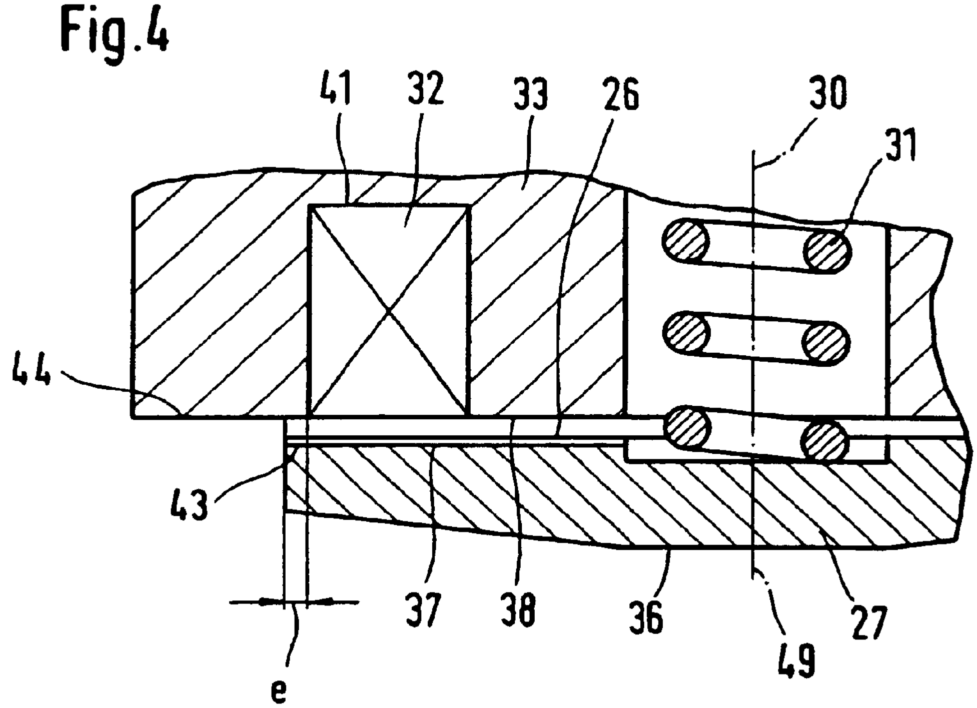
FIG. 4 shows an enlarged detailed view of another exemplary embodiment.

An additional exemplary embodiment is represented in FIG. 4. In this exemplary embodiment pole face 37 of armature 27 is designed without a recess, but it has an external diameter which is a little greater than the internal diameter of outer pole face section 44 of the magnetic core. Preferably, the external diameter of pole face 37 of the armature is designed to be about one millimeter larger than the internal diameter of outer pole face section 44 of magnetic core 33. When a current is applied to the electromagnet, the magnetic field in the overlapping region e of pole face 37 and of outer pole face section 44 is strengthened, since there the magnetic field lines have to run more densely. The strengthening is the greater, the smaller the overlapping region e. In the case of a radial deflection of the armature plate, strong reluctance forces act in this region, which drive the armature plate back into the centrical position, in which centerlines 30, 45 lie coaxially (i.e. lie on a straight line).

What is claimed is:

1. A solenoid valve for controlling an injection valve of an internal combustion engine, comprising:

a housing part;

a valve seat;

a valve spring;

an electromagnet including a magnetic coil and a magnetic core;

an armature acted upon by the valve spring and axially movable between the electromagnet and the valve seat; and a control valve member moveable by the armature and able to cooperate with the valve seat for opening and closing a fuel passage;

wherein the armature is situated in the housing part and is movable, without an arrangement for mechanical guiding, in a radial direction; and wherein the armature aligns in the radial direction into a centrical position with reference to a first centerline of the electromagnet by a magnetic reluctance force when a current is applied to the electromagnet.

2. The solenoid valve as recited in claim 1, wherein the armature includes a disk-shaped armature plate able to act directly upon the control valve member using a side of the disk-shaped armature plate facing away from the electromagnet.

3. The solenoid valve as recited in claim 2, wherein:

the disk-shaped armature plate and the control valve member are produced as separate parts; and the disk-shaped armature plate is shiftable in the radial direction relative to the control valve member.

4. The solenoid valve as recited in claim 1, wherein:

the magnetic core includes a first plurality of geometric structures situated concentrically about the first centerline at a first pole face;

the armature includes a second plurality of geometric structures situated concentrically about a second centerline of the armature at a second pole face, the first pole face and the second pole face mutually facing each other; and the first plurality of geometric structures and the second plurality of geometric structures cooperate to align the armature into the centrical position when the current is applied to the electromagnet.

5. The solenoid valve as recited in claim 1, wherein a second centerline of the armature is situated concentrically with the fuel passage when the armature is in the centrical position.

6. The solenoid valve as recited in claim 4, wherein:

the first plurality of geometric structures and the second plurality of geometric structure are formed by respective recesses in the first pole face and the second pole face of the magnetic core and of the armature facing each other; and the first plurality of geometric structures and the second plurality of geometric structures are situated one over another in a covering manner when the armature is in the centrical position.

7. The solenoid valve as recited in claim 6, wherein:

the first pole face includes a first annular recess, the magnetic coil being situated in the first annular recess; and the second pole face of the armature facing the electromagnet includes one of a second annular recess and a partially annular recess, the one of the second annular recess and the partially annular recess being allocated to the first annular recess and being situated concentrically about the second centerline.

8. The solenoid valve as recited in claim 4, wherein:

the first plurality of geometric structures are formed by a first annular pole face section of the magnetic core surrounding the magnetic coil; and the second plurality of geometric structures are formed by one of a second circular pole face of the armature and a second annular pole face of the armature, an external diameter of the one of the second circular pole face and the second annular pole face being slightly larger than an internal diameter of the first annular pole face section.

9. The solenoid valve as recited in claim 8, wherein the external diameter is less than about one millimeter larger than the internal diameter.

10. The solenoid valve as recited in claim 1, wherein:

the valve seat is centrically situated in a truncated cone-shaped area of a valve piece including the fuel passage, the truncated cone-shaped area projecting towards the armature; and a space surrounding the truncated cone-shaped area forms an accommodation for an adjusting nut by which the valve piece is fixed in the injection valve.

* * * * *